(12) United States Patent
Etchegoyen

(10) Patent No.: US 8,213,907 B2
(45) Date of Patent: Jul. 3, 2012

(54) SYSTEM AND METHOD FOR SECURED MOBILE COMMUNICATION

(75) Inventor: Craig Stephen Etchegoyen, Irvine, CA (US)

(73) Assignee: UNILOC Luxembourg S. A., Luxembourg (LU)

( * ) Notice: Subject to any disclaimer, the term of this patent is extended or adjusted under 35 U.S.C. 154(b) by 168 days.

(21) Appl. No.: 12/828,473

(22) Filed: Jul. 1, 2010

(65) Prior Publication Data

US 2011/0009092 A1     Jan. 13, 2011

Related U.S. Application Data

(60) Provisional application No. 61/223,998, filed on Jul. 8, 2009.

(51) Int. Cl.
*H04M 1/66* (2006.01)
*H04M 1/68* (2006.01)
*H04M 3/16* (2006.01)

(52) U.S. Cl. .......................... 455/411; 380/247; 455/410

(58) Field of Classification Search ................. 455/410, 455/411, 403; 379/161; 380/247–250; 726/2–10, 726/16–21
See application file for complete search history.

(56) References Cited

U.S. PATENT DOCUMENTS

| | | |
|---|---|---|
| 4,351,982 A | 9/1982 | Miller et al. |
| 4,658,093 A | 4/1987 | Hellman |
| 4,704,610 A | 11/1987 | Smith et al. |
| 4,796,220 A | 1/1989 | Wolfe |
| 5,210,795 A | 5/1993 | Lipner et al. |
| 5,239,648 A | 8/1993 | Nukui |
| 5,291,598 A | 3/1994 | Grundy |
| 5,414,269 A | 5/1995 | Takahashi |
| 5,418,854 A | 5/1995 | Kaufman et al. |
| 5,440,635 A | 8/1995 | Bellovin et al. |
| 5,490,216 A | 2/1996 | Richardson, III |
| 5,666,415 A | 9/1997 | Kaufman |
| 5,745,879 A | 4/1998 | Wyman |
| 5,754,763 A | 5/1998 | Bereiter |
| 5,790,664 A | 8/1998 | Coley et al. |
| 5,925,127 A | 7/1999 | Ahmad |
| 5,974,150 A | 10/1999 | Kaish et al. |
| 6,009,401 A | 12/1999 | Horstmann |

(Continued)

FOREIGN PATENT DOCUMENTS

AU     678985     6/1997

(Continued)

OTHER PUBLICATIONS

Williams, R., "A Painless Guide to CRC Error Detection Algorithms", Ver. 3, Aug. 19, 1993.

(Continued)

*Primary Examiner* — Ajit Patel
(74) *Attorney, Agent, or Firm* — Sean D. Burdick

(57) ABSTRACT

A method achieves secure mobile communications by authenticating a mobile device seeking communication with a secure server. The method prescribes steps for generating a code to indicate a plurality of portions of a digital fingerprint to request from the mobile device, each portion representing a different parameter of the mobile device, sending the code to the mobile device, receiving from the mobile device a response code representing the requested plurality of portions of the digital fingerprint, comparing each portion of the received plurality of portions with one or more predetermined codes, and granting the mobile device an access privilege when results of the comparison satisfy a predetermined minimum accuracy.

17 Claims, 7 Drawing Sheets

U.S. PATENT DOCUMENTS

| | | | |
|---|---|---|---|
| 6,044,471 A | 3/2000 | Colvin | |
| 6,158,005 A | 12/2000 | Bharathan et al. | |
| 6,230,199 B1 | 5/2001 | Revashetti et al. | |
| 6,233,567 B1 | 5/2001 | Cohen | |
| 6,243,468 B1 | 6/2001 | Pearce et al. | |
| 6,294,793 B1 | 9/2001 | Brunfeld et al. | |
| 6,330,670 B1 | 12/2001 | England et al. | |
| 6,418,472 B1 | 7/2002 | Mi et al. | |
| 6,449,645 B1 | 9/2002 | Nash | |
| 6,536,005 B1 | 3/2003 | Augarten | |
| 6,785,825 B2 | 8/2004 | Colvin | |
| 6,826,690 B1 | 11/2004 | Hind et al. | |
| 6,859,793 B1 | 2/2005 | Lambiase | |
| 6,920,567 B1 | 7/2005 | Doherty et al. | |
| 6,976,009 B2 | 12/2005 | Tadayon et al. | |
| 7,032,110 B1 | 4/2006 | Su et al. | |
| 7,069,440 B2 | 6/2006 | Aull | |
| 7,069,595 B2 | 6/2006 | Cognigni et al. | |
| 7,085,741 B2 | 8/2006 | Lao et al. | |
| 7,188,241 B2 | 3/2007 | Cronce et al. | |
| 7,203,966 B2 | 4/2007 | Abburi et al. | |
| 7,206,765 B2 | 4/2007 | Gilliam et al. | |
| 7,272,728 B2 | 9/2007 | Pierson et al. | |
| 7,305,562 B1 | 12/2007 | Bianco et al. | |
| 7,310,813 B2 | 12/2007 | Lin et al. | |
| 7,319,987 B1 | 1/2008 | Hoffman et al. | |
| 7,327,280 B2 | 2/2008 | Bachelder et al. | |
| 7,337,147 B2 | 2/2008 | Chen et al. | |
| 7,343,297 B2 | 3/2008 | Bergler et al. | |
| 7,463,945 B2 | 12/2008 | Kiesel et al. | |
| 7,653,899 B1 | 1/2010 | Lindahl et al. | |
| 7,836,121 B2 | 11/2010 | Elgressy et al. | |
| 2001/0034712 A1 | 10/2001 | Colvin | |
| 2001/0044782 A1 | 11/2001 | Hughes et al. | |
| 2002/0019814 A1 | 2/2002 | Ganesan | |
| 2002/0082997 A1 | 6/2002 | Kobata et al. | |
| 2002/0091937 A1 | 7/2002 | Ortiz | |
| 2002/0161718 A1 | 10/2002 | Coley et al. | |
| 2003/0065918 A1 | 4/2003 | Willey | |
| 2003/0125975 A1 | 7/2003 | Danz et al. | |
| 2003/0172035 A1 | 9/2003 | Cronce et al. | |
| 2004/0024860 A1 | 2/2004 | Sato et al. | |
| 2004/0030912 A1 | 2/2004 | Merkle et al. | |
| 2004/0059929 A1 | 3/2004 | Rodgers et al. | |
| 2004/0107360 A1 | 6/2004 | Herrmann et al. | |
| 2004/0117321 A1 | 6/2004 | Sancho | |
| 2004/0143746 A1 | 7/2004 | Ligeti et al. | |
| 2004/0172558 A1 | 9/2004 | Callahan et al. | |
| 2004/0187018 A1 | 9/2004 | Owen et al. | |
| 2005/0034115 A1 | 2/2005 | Carter et al. | |
| 2005/0108173 A1 | 5/2005 | Stefik et al. | |
| 2005/0138155 A1 | 6/2005 | Lewis | |
| 2005/0166263 A1 | 7/2005 | Nanopoulos et al. | |
| 2005/0172280 A1 | 8/2005 | Ziegler et al. | |
| 2005/0268087 A1 | 12/2005 | Yasuda et al. | |
| 2006/0072444 A1 | 4/2006 | Engel et al. | |
| 2006/0080534 A1 | 4/2006 | Yeap et al. | |
| 2006/0095454 A1 | 5/2006 | Shankar et al. | |
| 2006/0161914 A1 | 7/2006 | Morrison et al. | |
| 2006/0242081 A1 | 10/2006 | Ivanov et al. | |
| 2006/0265337 A1 | 11/2006 | Wesinger, Jr. | |
| 2006/0265446 A1 | 11/2006 | Elgressy et al. | |
| 2006/0282511 A1 | 12/2006 | Takano et al. | |
| 2007/0061566 A1 | 3/2007 | Bailey et al. | |
| 2007/0168288 A1 | 7/2007 | Bozeman | |
| 2007/0174633 A1* | 7/2007 | Draper et al. | 713/186 |
| 2007/0198422 A1 | 8/2007 | Prahlad et al. | |
| 2007/0203846 A1 | 8/2007 | Kavuri et al. | |
| 2007/0209064 A1 | 9/2007 | Qin et al. | |
| 2007/0219917 A1 | 9/2007 | Liu et al. | |
| 2007/0266447 A1* | 11/2007 | Hollander | 726/34 |
| 2007/0282615 A1 | 12/2007 | Hamilton et al. | |
| 2008/0052775 A1 | 2/2008 | Sandhu et al. | |
| 2008/0065552 A1 | 3/2008 | Elazar et al. | |
| 2008/0086423 A1 | 4/2008 | Waites | |
| 2008/0120195 A1 | 5/2008 | Shakkarwar | |
| 2008/0147556 A1 | 6/2008 | Smith et al. | |
| 2008/0228578 A1 | 9/2008 | Mashinsky | |
| 2008/0244754 A1 | 10/2008 | Curren | |
| 2008/0268815 A1 | 10/2008 | Jazra et al. | |
| 2008/0320607 A1 | 12/2008 | Richardson | |
| 2009/0083730 A1 | 3/2009 | Richardson | |
| 2009/0113088 A1 | 4/2009 | Illowsky et al. | |
| 2009/0132813 A1* | 5/2009 | Schibuk | 713/158 |
| 2009/0138975 A1 | 5/2009 | Richardson | |
| 2010/0332337 A1* | 12/2010 | Bullock | 705/26 |

FOREIGN PATENT DOCUMENTS

| | | |
|---|---|---|
| EP | 1637958 | 3/2006 |
| EP | 1637961 | 3/2006 |
| EP | 1670188 | 6/2006 |
| GB | 2355322 | 4/2001 |
| WO | WO 92/09160 | 5/1992 |
| WO | WO 9220022 | 11/1992 |
| WO | WO 9301550 | 1/1993 |
| WO | WO 9535533 | 12/1995 |
| WO | WO 00/58895 | 10/2000 |
| WO | WO 0067095 | 11/2000 |
| WO | WO 01/90892 | 11/2001 |
| WO | WO 2005104686 | 11/2005 |
| WO | WO2007060516 | 5/2007 |
| WO | WO2008013504 | 1/2008 |
| WO | WO 2008/127431 | 10/2008 |
| WO | WO2008157639 | 12/2008 |
| WO | WO2009039504 | 3/2009 |
| WO | WO2009065135 | 5/2009 |
| WO | WO2009076232 | 6/2009 |
| WO | WO2009105702 | 8/2009 |
| WO | WO2009143115 | 11/2009 |
| WO | WO 2009158525 | 12/2009 |
| WO | WO 2010/093683 | 8/2010 |

OTHER PUBLICATIONS

Angha, F. et al., "Securing Transportation Network Infrastructure with Patented Technology of Device Locking—Developed by Uniloc USA", avail. at: http://www.dksassociates.com/admin/paperfile/ITS%20World%20Paper%20Submission_Uniloc%20_2_.pdf, Oct. 24, 2006.

Econolite, "Econolite and Uniloc Partner to Bring Unmatched Infrastructure Security to Advanced Traffic Control Networks with Launch of Strongpoint", avail. at: http://www.econolite.com/docs/press/20080304_Econolite_StrongPoint.pdf, Mar. 4, 2008.

Housley et al., "Internet x.509 Public Key Infracstructure Certificate and CRL Profile," The Internet Society, Network Working Group, 1999, 75 pages. [RFC 2459].

Muncaster et al., "Continous Multimodal Authentication Using Dynamic Baysian Networks," Second Workshop on Multimodal User Authentication, Toulouse, France, May 11-12, 2006. XP55003041.

Sim et al. "Continous Verification Using Multimodal Biometrics", IEEE Transactions on Pattern Analysis and Machine Intelligence, vol. 29, No. 4, Apr. 1, 2007, IEEE Serivce Center, Los Alamitos, CA, pp. 687-700. XP011168507.

Wikipedia: "Software Extension," May 28, 2009, Internet Article retrieved on Oct. 11, 2010. XP002604710.

Williams et al., "Web Database Applications with PHP & MySQL," O'Reilly Media Chapter 1. Database Applications and the Web Mar. 2002, Internet Article retrieved on Sep. 21, 2010. XP002603488.

"Canon User Manual—Nikon Coolpix S52/S52c," Apr. 21, 2008, entire manual.

David J-L, "Cookieless Data Persistence in Possible," Apr. 23, 2003, Internet Article retrieved on Sep. 21, 2010. XP002603490.

Jensen et al., "Assigning and Enforcing Security Policies on Handheld Devices," 2002, 8 pages.

Johnson et al. "Dynamic Source Routing in Ad Hoc Wireless Networks," Mobile Computing, Kluwer Academic Publishers, 1996.

* cited by examiner

0
SYSTEM AND METHOD FOR SECURED MOBILE COMMUNICATION

This application claims priority to U.S. Provisional Application No. 61/223,998 which was filed Jul. 8, 2009 and which is fully incorporated herein by reference.

BACKGROUND

1. Field of the Invention

The present invention is directed toward a method and system for establishing secured communication between a mobile device and a secured network.

2. Description of the Related Art

More consumers are purchasing goods such as music, e-books, and video programming using mobile devices such as mobile phones, netbooks, laptops, and electronic book readers. As electronic commerce in the wireless space gets larger and becomes a platform of choice, there is an increased risk for security breaches into such wireless infrastructures. Accordingly, current and future infrastructures may be vulnerable to attack or abuse from unauthorized intruders, e.g., "hackers" or insiders operating outside their authority, gaining access to the system using stolen or "cracked" security information. Accordingly, it would be desirable to provide a cost-effective system and method for improving the security of a communication network, such as, for example, database servers, application servers, control systems, power supply systems, and other devices supporting an IP or web-based user interface or the like. Further, it would be desirable to provide a technique for controlling access to the network from a mobile device.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with a system for authenticating a mobile device for access to a secured network, the method comprising: generating a code to indicate a plurality of portions of a digital fingerprint to request from the mobile device, wherein each portion represents a different component of the mobile device; sending the code to a remote location; receiving a response code representing the requested plurality of portions of the digital fingerprint; comparing each portion of the received plurality of portions with one or more predetermined codes; and granting the mobile device access privilege when a result of the comparison satisfies a predetermined minimum accuracy.

Each of the digital fingerprints may be generated using one or more of user-configurable and non-user-configurable parameters of the mobile device. Non-user-configurable parameters may be, for example, physical parameters of the device, unique manufacturer characteristics, carbon and silicone degradation, small device failures, and the like.

In order to grant the user some leeway in device upgrade and changes, the predetermined percentage of accuracy may be set a flexible range. In one embodiment, the predetermined percentage is 75% or greater. In this way, the user will not be prohibited from accessing the secured network because of a simple software or hardware upgrade in the user's mobile device.

In sending the code to a remote location, the code may be sent to a mobile device using a short messaging system (SMS) message. Alternatively, the code may be sent to an email address where the user may retrieve the code and subsequently enter into the mobile device. Once the mobile device has generated a response code, in response to the code received either by SMS or by user entered, the mobile device may send out the response code to an authenticating server using a SMS message.

Further, in addition to verifying the response code, the method may be configured to verify a user name and a password prior to granting the mobile device access privilege.

In accordance with one or more embodiments and corresponding disclosure thereof, various aspects are described in connection with a system for authenticating a mobile device for access to a secured network, the method comprising: receiving a request code from a server at the mobile device, the request code to indicate a plurality of portions of a digital fingerprint to send to the server, wherein each portion to represent a different component of the mobile device; generating a digital fingerprint for each component indicated by the request code using one or more of user-configurable and non-user-configurable parameters of the mobile device; generating a response code representing the requested plurality of portions of the generated digital fingerprint; and obtaining access privilege to a secured network in response to the generated response code.

In accordance with yet another embodiment of the present invention a computer readable medium is provided. The computer readable medium having stored thereon, computer executable instructions that, if executed by a device, cause the device to perform a method comprising: generating a code to indicate a plurality of portions of a digital fingerprint to request from the mobile device, wherein each portion represents a parameter of a different component of the mobile device; sending the code to a remote location; receiving a response code representing the requested plurality of portions of the digital fingerprint; comparing each portion of the received plurality of portions with one or more predetermined codes; and granting the mobile device access privilege when a result of the comparison satisfies a predetermined minimum accuracy.

In accordance with yet another embodiment of the present invention, a computer readable medium is provided. The computer readable medium may have stored thereon, computer executable instructions that, if executed by a device, cause the device to perform a method comprising: receiving a request code from a server at the mobile device, the request code to indicate a plurality of portions of a digital fingerprint to send to the server, wherein each portion to represent a different component of the mobile device; generating a digital fingerprint for each component indicated by the request code using one or more of user-configurable and non-user-configurable parameters of the mobile device; generating a response code representing the requested plurality of portions of the generated digital fingerprint; and obtaining access privilege to a secured network in response to the generated response code.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention.

DETAILED DESCRIPTION

Figure 1A:
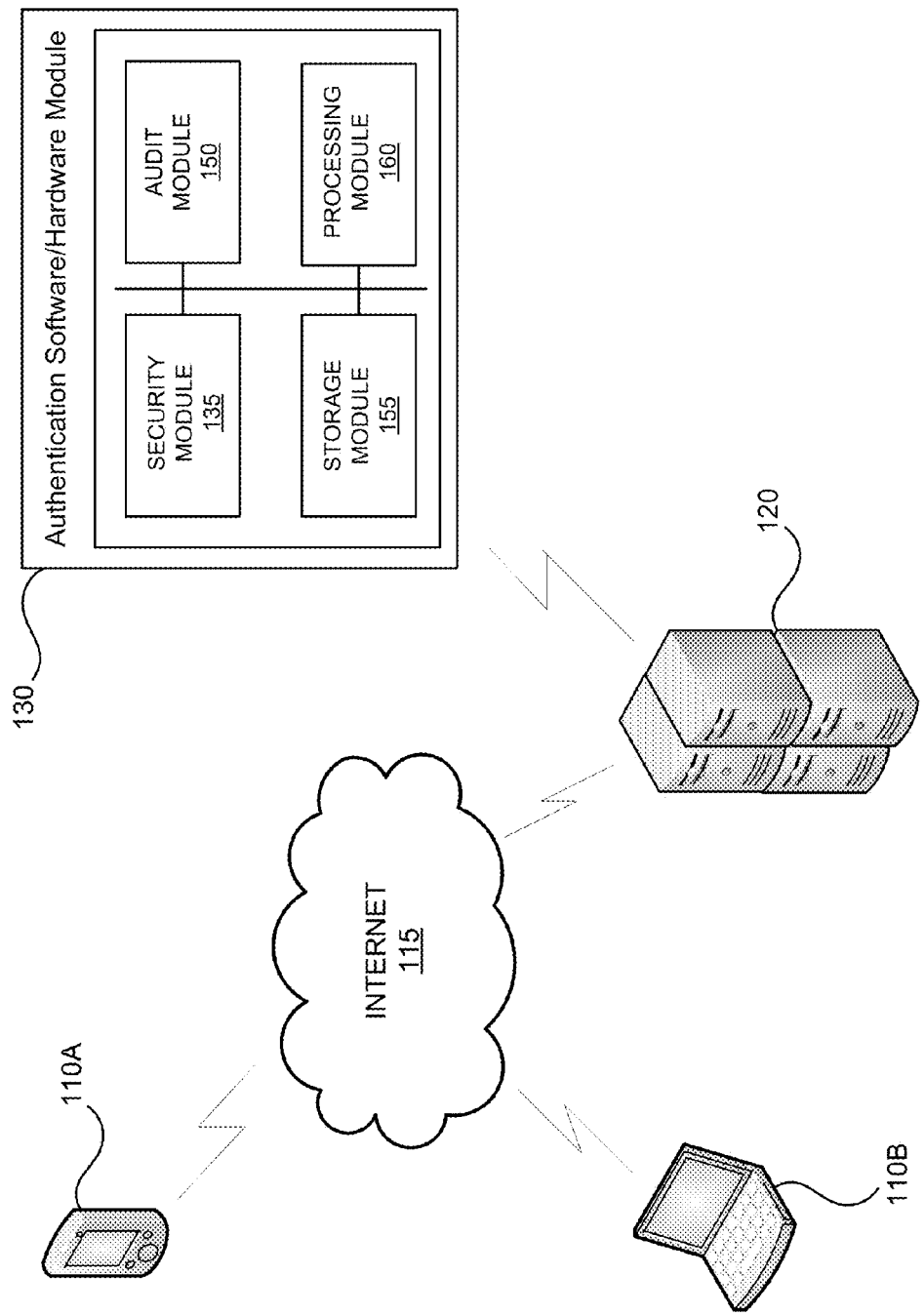
FIG. 1A is a block diagram of one embodiment of a computing system in which a method for authenticating mobile devices may be implemented according to the present invention.

Mobile devices are ubiquitous in modern day society and are the driving force behind electronic commerce in the wireless space. Consumers are now, more than ever, purchasing music, electronic books, and video programming such as movies, TV shows, and news using their mobile devices. Additionally, consumers are using mobile devices to gain access to email, social networking sites, online game services, etc. This creates the need for a fast and secured method, system, and apparatus for authenticating mobile devices and to determine their access privileges.

According to embodiments of the present invention, a method for authenticating a mobile device is described below. The method described below can also be implemented in a system or a computer apparatus. The method for authenticating a mobile device may require an authenticating server to generate a request code representing one or more fingerprints of one or more components of a mobile device. The request code may be configured to represent one or more portions of fingerprints of components located in the mobile device.

The request code may be transmitted to a mobile device via short messaging system (SMS), multimedia messaging system (MMS), email, or other wireless communication standard such as WiMAX, WiFi, or HomeRF. Alternatively, the user may enter the request code if the code was sent to the user's email.

The request code may be generated such that when it is read by a mobile device, a response code is generated by the mobile device. The response code comprises one or more portions of the requested fingerprints of components inside of the mobile device. For example, the request code may request the following: the first five digits of the serial number of the mobile device; the version of the operating system; and/or the last four digits of the serial number of a microprocessor. In receiving the above request code, the mobile device may collect the requested portions of fingerprints and generate a response code. The response code may be generated using a hash function such as a one-way hash or a two-way hash function using the information gathered in response to the request code.

The response code may be transmitted to an authenticating server via email or short messaging system (SMS). Where SMS is used, the mobile device may be configured to automatically transmit the response code to the authenticating server after receiving and processing the request code. The mobile device may also request a confirmation from the user prior to sending the response code to the authenticating server.

Once the response code is received at the authenticating server, the authenticating server may compare each of the one or more portions of fingerprints with predetermined code(s) or previously stored code(s). Where the mobile device is registering with the authenticating server for the first time, the response code may be translated and stored. If a match is found between the response code and one of the stored codes, the mobile device may be granted access to the secured network. The authenticating may also request the user to enter a username and a password in addition to the verification of the response code. Alternatively, the verification of the response code alone is sufficient and verification of the username and password is bypassed. When the mobile device is registering for the first time, the user may be required to enter the username and password.

Before describing the invention in further detail, it is useful to describe an example environment with which the invention can be implemented. FIG. 1A is a diagram illustrating an example environment 100 with which the online commerce restriction, system, and apparatus is implemented according to one or more embodiments of the present invention. The illustrated example environment 100 includes mobile devices 110a and 110b, a network 115, a server 120, and a software/hardware module 130. Mobile devices 110 may include a security client (not shown) configured to authenticate the mobile device to an authenticating server as generally described above. The security client may comprise a stand-alone application or an applet running within a web browser on the device 110 (e.g., an applet comprising executable code for a Java Virtual Machine). The security client may be embedded in or associated with another software application, including but not limited to a web browser. For example, the security client may be embedded in or associated with a tool bar of a software application, such as, for example, a web browser. The security client may prompt the user to register with an online software registration service, or may run in the background with little or no interaction with the user of device 110.

The security client may also be digitally distributed or streamed from one or more servers. Network 115 may comprise the Internet, a local area network, or other form of communication network.

Figure 1B:
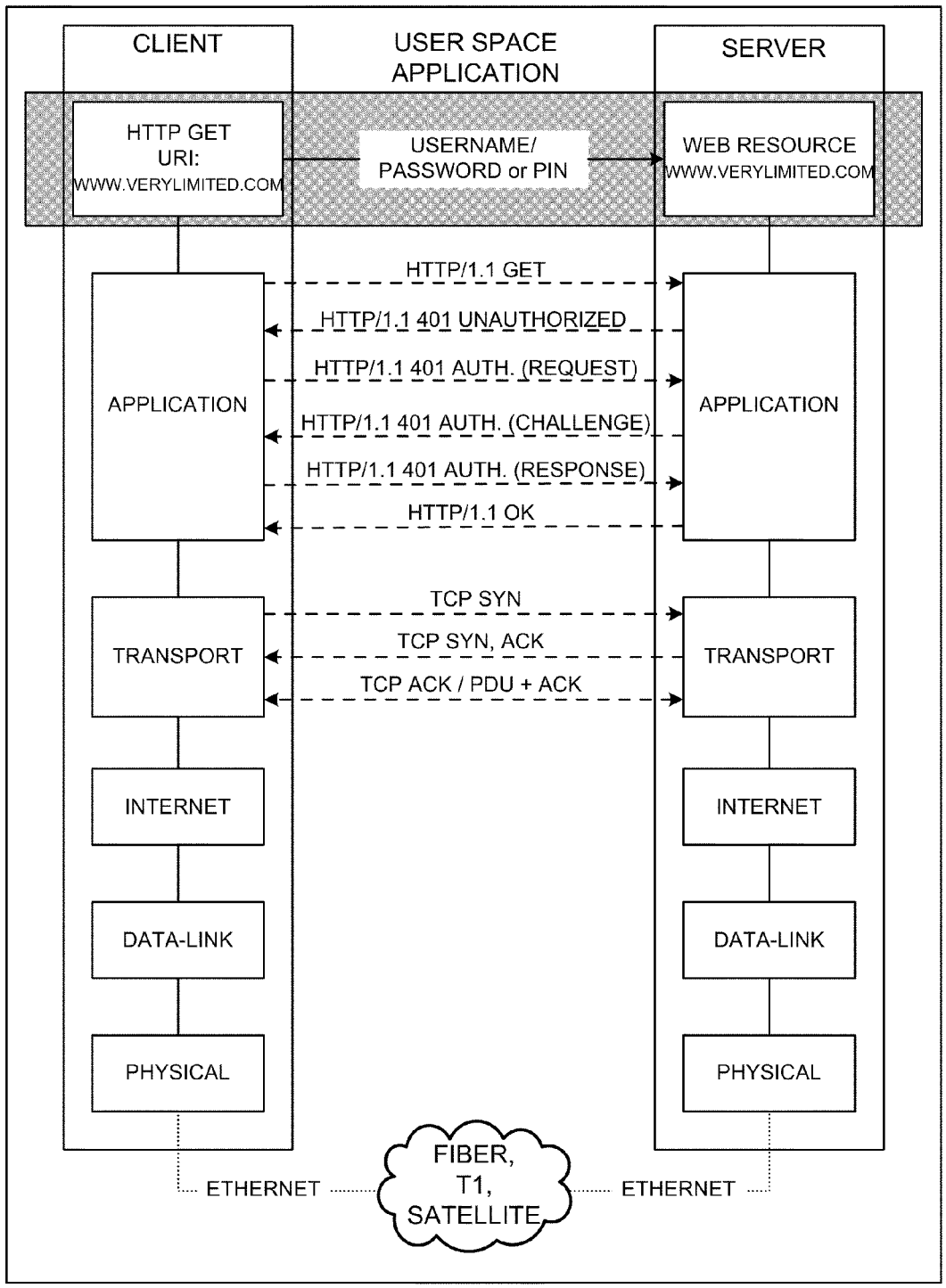
FIG. 1B is a block diagram illustrating an open system interconnection (OSI) environment in which methods for authenticating mobile devices may be implemented according to one embodiment of the present invention.

Referring now to FIG. 1B, the security client may be implemented in one or more of the open system interconnection (OSI) layers. In one embodiment, the security client is implemented in the application layer as a flash application, an applet application, a standalone application, or an application integrated into a web browser using application communication protocol such as HTTP, HTTPS, and SIP. Similarly, security module 135 may also reside in one or more of the OSI layers of authenticating server 120.

Referring again to FIG. 1A, computing devices 110a-b may be in operative communication with authenticating server 120. While only one computing device 110 is illustrated, it will be understood that a given system may comprise any number of computing devices. Computing device 110 may be, but is not limited to, a mobile phone, netbook, a mobile game console, mobile computing device, a tablet computer, a personal digital assistant, a wireless communication device, an onboard vehicle computer, or any other device capable of communication with a computer network.

Per the request code received from the authenticating server or manually entered by the user of the mobile device, the security client may collect information regarding computing device 110, as instructed by the request code. The request code may comprises information or instruction telling the security client to collect a number of parameters which are expected to be unique to the computing device environment. The parameters collected may include, for example, hard disk volume name, user name, device name, user password, hard disk initialization date, etc. The collected information may include information that identifies the hardware comprising the platform on which the web browser runs, such as, for example, CPU number, or other parameters associated with the firmware in use. The system information may further include system configuration information, such as amount of memory, type of processor, software or operating system serial number, etc.

Based on the collected information, the security client may generate a response code based on one or more identifiers or fingerprints 224 (see FIG. 2) that is unique to each component of computing device 110. The term device identifier, as used herein, refers to one or more fingerprints of hardware and software components inside of device 110. The request code may include a code that represents the device identifier, which is a fingerprint of a component of device 110 As mentioned above, the request code may specify one or more portions of a fingerprint (device identifier) of a component of device 110. Alternatively, the request code may specify one or more fingerprints in whole.

The device identifier 224 may be generated and stored in a hidden directory of the device 110 and/or at a remote location, such as the server 120. The device identifier 224 may incorporate the device's IP address and/or other geo-location code to add another layer of specificity to device's unique identifier.

It is noted that the security client running on the computing device or otherwise having access to the computing device's hardware and file system may generate a unique device identifier (e.g., device identifier 224) using a process that operates on data indicative of the computing device's configuration and hardware. The device identifier may be generated using a combination of user-configurable and non-user-configurable machine parameters as input to a process that results in the device identifier, which may be expressed in digital data as a binary number. Each machine parameter is data determined by a hardware component, software component, or data component specific to the device that the unique identifier pertains to. Machine parameters may be selected based on the target device system configuration such that the resulting device identifier has a very high probability (e.g., greater than 99.999%) of being unique to the target device. In addition, the machine parameters may be selected such that the device identifier includes at least a stable unique portion up to and including the entire identifier, that has a very high probability of remaining unchanged during normal operation of the target device. Thus, the resulting device identifier should be highly specific, unique, reproducible and stable as a result of properly selecting the machine parameters. Once the device identifier is generated, a response code is produced using specific portions of the device identifier as requested by the request code.

The application for generating the device identifier may also operate on the collected parameters with one or more algorithms to generate the device identifier. This process may include at least one irreversible transformation, such as, for example, a cryptographic hash function, such that the input machine parameters cannot be derived from the resulting device identifier. Each device identifier, to a very high degree of certainty, cannot be generated except by the suitably configured application operating or otherwise having had access to the same computing device for which the device identifier was first generated. Conversely, each identifier, again to a very high degree of certainty, can be successfully reproduced by the suitably configured application operating or otherwise having access to the same computing device on which the identifier was first generated.

The application may operate by performing a system scan to determine a present configuration of the computing device. The application may then select the machine parameters to be used as input for generating the unique device identifier. Selection of parameters may vary depending on the system configuration. Once the parameters are selected, the application may generate the identifier.

Further, generating the device identifier may also be described as generating a device fingerprint and may entail the sampling of physical, non-user configurable properties as well as a variety of additional parameters such as uniquely generated hashes and time sensitive values. Physical device parameters available for sampling may include, for example, unique manufacturer characteristics, carbon and silicone degradation and small device failures.

The process of measuring carbon and silicone degradation may be accomplished by measuring a chip's ability to process complex mathematical computations, and its ability to respond to intensive time variable computations. These processes measure how fast electricity travels through the carbon. Using variable offsets to compensate for factors such as heat and additional stresses placed on a chip during the sampling process allows for each and every benchmark to reproduce the expected values. During a standard operating lifetime, the process of passing electricity through the various switches causes a computer chip to degrade. These degradations manifest as gradually slower speeds that extend the processing time required to compute various benchmarking algorithms.

In addition to the chip benchmarking and degradation measurements, the process for generating a device identifier may include measuring physical, non-user-configurable characteristics of disk drives and solid state memory devices. Each data storage device has a large variety of damage and unusable data sectors that are nearly unique to each physical unit. The ability to measure and compare values for damaged sectors and data storage failures provides a method for identifying storage devices.

Device parameter sampling, damage measurement and chip benchmarking make up just a part of device fingerprinting technologies described herein. These tools may be further extended by the use of complex encryption algorithms to convolute the device identifier values during transmission and comparisons. Such encryption processes may be used in conjunction with random sampling and key generations.

The device identifier may be generated by utilizing machine parameters associated with one or more of the following: machine model; machine serial number; machine copyright; machine ROM version; machine bus speed; machine details; machine manufacturer; machine ROM release date; machine ROM size; machine UUID; and machine service tag.

The device identifier may also be generated by utilizing machine parameters associated with one or more of the following: CPU ID; CPU model; CPU details; CPU actual speed; CPU family; CPU manufacturer; CPU voltage; and CPU external clock.

The device identifier may also be generated by utilizing machine parameters associated with one or more of the following: memory model; memory slots; memory total; and memory details.

The device identifier may also be generated by utilizing machine parameters associated with one or more of the following: video model; video details; display model; display details; audio model; and audio details.

The device identifier may also be generated by utilizing machine parameters associated with one or more of the following: network model; network address; Bluetooth address; Blackbox model; Blackbox serial; Blackbox details; Blackbox damage map; Blackbox volume name; NetStore details; and NetStore volume name.

The device identifier may also be generated by utilizing machine parameters associated with one or more of the following: optical model; optical serial; optical details; keyboard model; keyboard details; mouse model; mouse details; printer details; and scanner details.

The device identifier may also be generated by utilizing machine parameters associated with one or more of the following: baseboard manufacturer; baseboard product name; baseboard version; baseboard serial number; and baseboard asset tag.

The device identifier may also be generated by utilizing machine parameters associated with one or more of the following: chassis manufacturer; chassis type; chassis version; and chassis serial number.

The device identifier may also be generated by utilizing machine parameters associated with one or more of the following: IDE controller; SATA controller; RAID controller; and SCSI controller.

The device identifier may also be generated by utilizing machine parameters associated with one or more of the following: port connector designator; port connector type; port connector port type; and system slot type.

The device identifier may also be generated by utilizing machine parameters associated with one or more of the following: cache level; cache size; cache max size; cache SRAM type; and cache error correction type.

The device identifier may also be generated by utilizing machine parameters associated with one or more of the following: fan; PCMCIA; modem; portable battery; tape drive; USB controller; and USB hub.

The device identifier may also be generated by utilizing machine parameters associated with one or more of the following: device model; device model IMEI; device model IMSI; and device model LCD.

The device identifier may also be generated by utilizing machine parameters associated with one or more of the following: wireless 802.11; webcam; game controller; silicone serial; and PCI controller.

Figure 2:
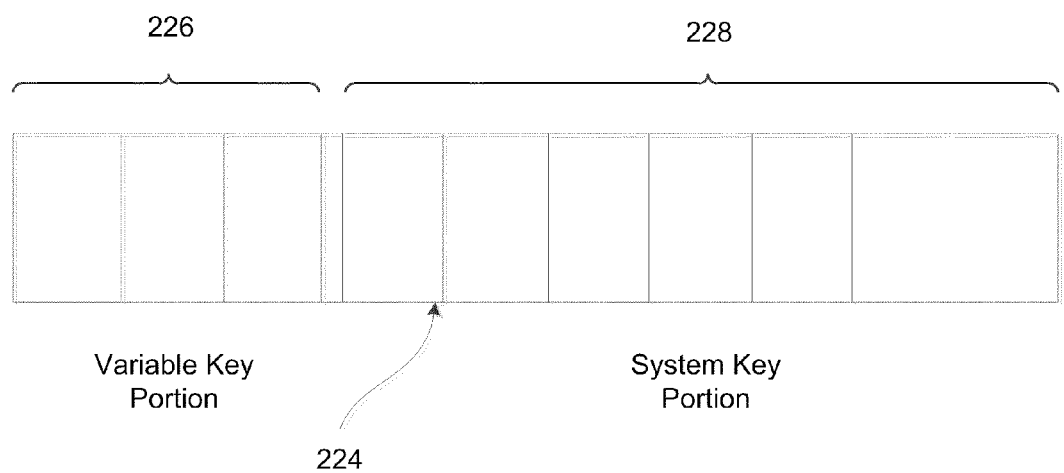
FIG. 2 is a block diagram showing one example of memory allocation for components that make up a device identifier for use with the present invention.

With reference to FIG. 2, in one embodiment, the device identifier 224 may include two components—namely, a variable key portion 226 and a system key portion 228. The variable key portion 226 may be generated at the time of registration of computing device 110 by reference to a variable platform parameter, such as via reference to system time information, although other parameters which are variable may be utilized in other embodiments. The system key portion 228 may include the above described parameters expected to be unique to the device 110, such as, for example, hard disk volume name, user name, computer name, user password, hard disk initialization date, or combinations thereof. Portions 226 and/or 228 may be combined with the IP address and/or other platform parameters of the device 110. It is noted that device identifiers, or portions thereof, may be encrypted to add an additional layer of specificity and security.

Referring again to FIG. 1, authenticating server 120 may comprise a hardware/software authentication module 130, which may include a security module 135, an audit module 150, a storage module 155, and a processing module 160. Security module 135 may be configured to authenticate the response code comprising one or more portions of device identifier 224 received from the security client on computing device 110. Alternatively, the response code may be sent in by the user via email or a web application.

The security client of computing device 110 may also include a registration routine that collects or receives information regarding the geo-location code of the device 110. A geo-locator (not shown) may comprise the IP address or the like of the device 110.

The security client may electronically send device identifier 224 and financial information to authenticating server 120. In the alternative, or in addition, a geo-location code, such as the IP address of the device 110, may be associated with the device identifier 224 and may be sent to the authenticating server 120, such as via a secured network connection. The authenticating server 120 may encrypt and store the data, such as the device identifier 224 and/or the geo-location code received from the computing device 110. Authenticating server 120 may also receive such data from a plurality of computing devices and store the received data in storage module 155. Authenticating server 120 may also generate a transaction identifier for the event or item of commerce the user is seeking to purchase. In one embodiment, the transaction identifier is transmitted to the security client for auditing purposes.

In one embodiment, the audit module 150 may generate an audit number by associating the transaction identifier with device identifier 224 and/or the geo-location code, and stores the generated audit number in storage module 155.

In one embodiment, security client of device 110 may send the device identifier 224 and/or the geo-location code to the server 120 in a piecemeal manner. The server 120 may in turn generate the audit number 142. Authenticating server 120 may receive or generate audit numbers from a plurality of computing devices and store the received audit numbers in the storage module 155.

It is noted that the audit number may be generated from device identifier 224, the transaction identifier, and/or the geo-location code via any number of suitable approaches. For example, the transaction identifier may be concatenated or linked with device identifier 224 and/or the geo-location code. It is also noted that the audit number may be stored in a hidden directory of computing device 110 and/or at a remote location, such as the authenticating server 120. It is further noted that device identifier 224, the transaction identifier, and/or the geo-location code may be extracted from the audit number 142 at a later time.

Audit module 150 may be configured to keep track of all sales and purchases of event tickets, goods, and services. Audit module 150 may record each purchase of the event tickets, goods, and services. Audit module 150 may also record the purchase date, purchase price, event/goods/service identifier, user's 405 financial data, device identifier, etc. Audit module 150 may store the collected data in storage module 155.

Figure 3:
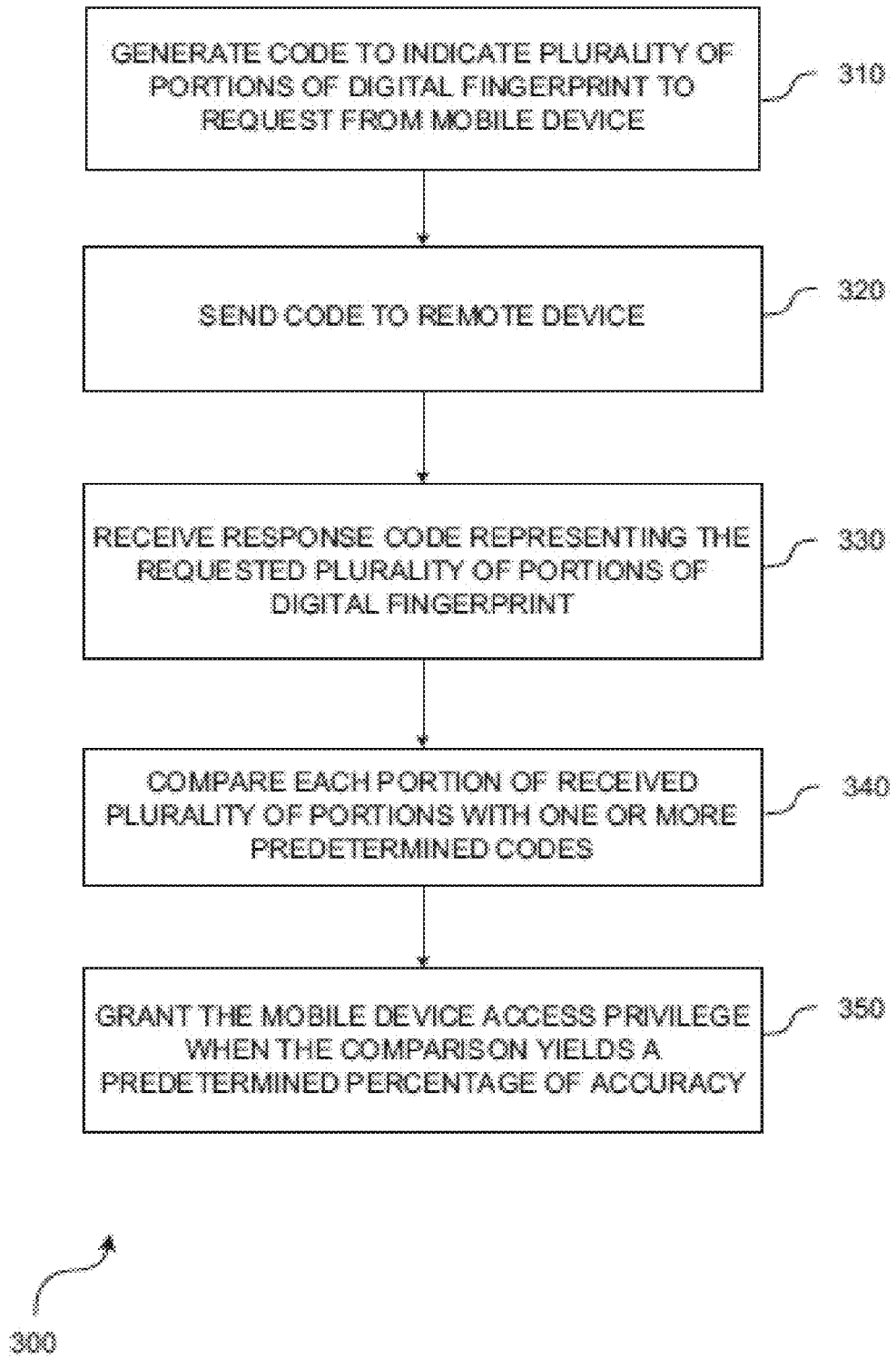
FIG. 3 is a flow chart illustrating one embodiment of a method according to the invention for authenticating a mobile device.

FIG. 3 illustrates an example process flow of a method 300 for authenticating a mobile device, on the authenticating server side, according to one embodiment of the present invention. Referring now to FIG. 3, method 300 starts at step 310 where a request code is generated to indicate a plurality of portions of digital fingerprints to request from a mobile device. Each portion of the fingerprint is an identifier similar to device identifier 224 as described above. The request code may request the fingerprint from one or more internal components of the mobile device. For example, the request code may request for the first four digits of the serial number of the microprocessor and/or the last five digits of an antenna serial number or OEM number.

At step 320, the request code is transmitted to a remote device such as mobile devices 110A and 110B. The request code may also be transmitted to the user via email or SMS. Once the request code is received by the user or by the mobile device, the user may enter the request code into the security client. As mentioned, the security client may be a stand-alone application, an applet, or integrated with the web browser. The security client is configured to translate the request code and determine which fingerprint of which internal components to generate. After having gathered all of the requested fingerprints, a response code is generated and displayed to the user. The security client may be configured to automatically send the response code to the authenticating server automatically. Alternatively, the response code is displayed to the user and/or stored for later delivery.

At step 330, a response code is received. The response code may be received via email, touchtone phone, web browser interface, SMS, or MMS. The response code is configured to represent the requested plurality portions of the fingerprints. Once the response code is received, it is deciphered into portions of one or more fingerprint that were requested by the request code.

At step 340, each of the received portions of fingerprints is compared with predetermined or previously stored fingerprint. If a match is found, the mobile device is then given access to the secured network.

Figure 4:
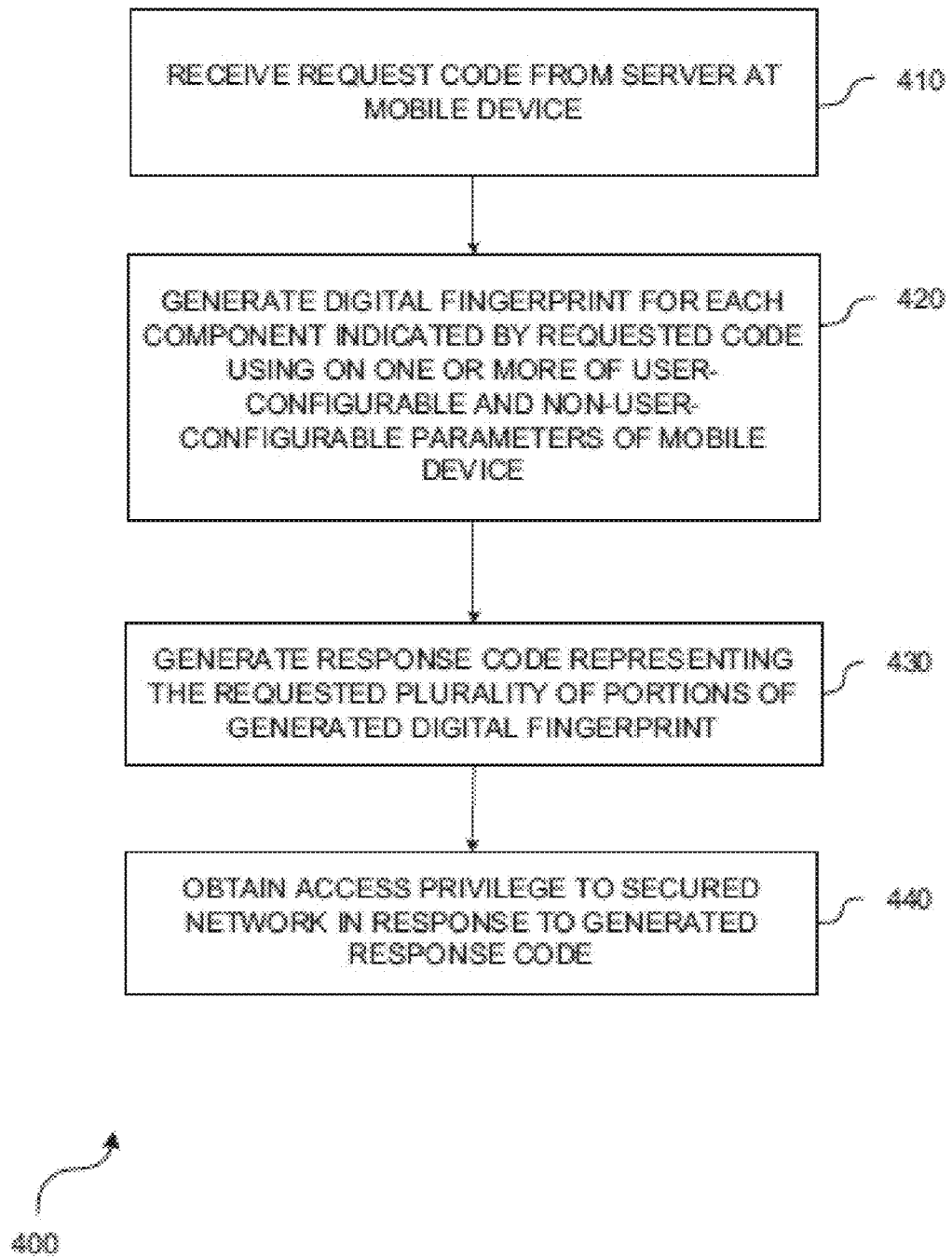
FIG. 4 is a flow chart illustrating another embodiment of a method according to the invention for authenticating a mobile device.

FIG. 4 illustrates an example process flow of a method 400 for authenticating a mobile device, on the mobile device side, according to one embodiment of the present invention. Referring now to FIG. 4, method 400 starts at step 410 where a request code is received from the server at the mobile device. The request code may be received via SMS, MMS, or other wireless means. Alternatively, the user may enter the request code into the security client of the mobile device. Once the request is entered, the security client deciphers the code and determines which one or more components of the mobile device to use for generating device identifiers 224 or digital fingerprints, at step 420. The components used to device identifiers 224 may comprise using one or more user and non-user configurable parameters of the mobile device. Additionally, the request may be encrypted into a predetermined digits or strings. The strings may have seven or more digits.

At step 430, a response code is generated. The response code may represent the requested one or more portions of the generated device identifiers 224. The response code may be encrypted into a number of certain digits, typically seven or more. Once the response code is generated, it may be displayed to the user or be automatically transmitted to the authenticating server. The response code may be transmitted to the server via email, SMS, MMS, or other web application. At step 440, the mobile device may obtain access privilege to a secured network in response to the generated response code.

Figure 5:
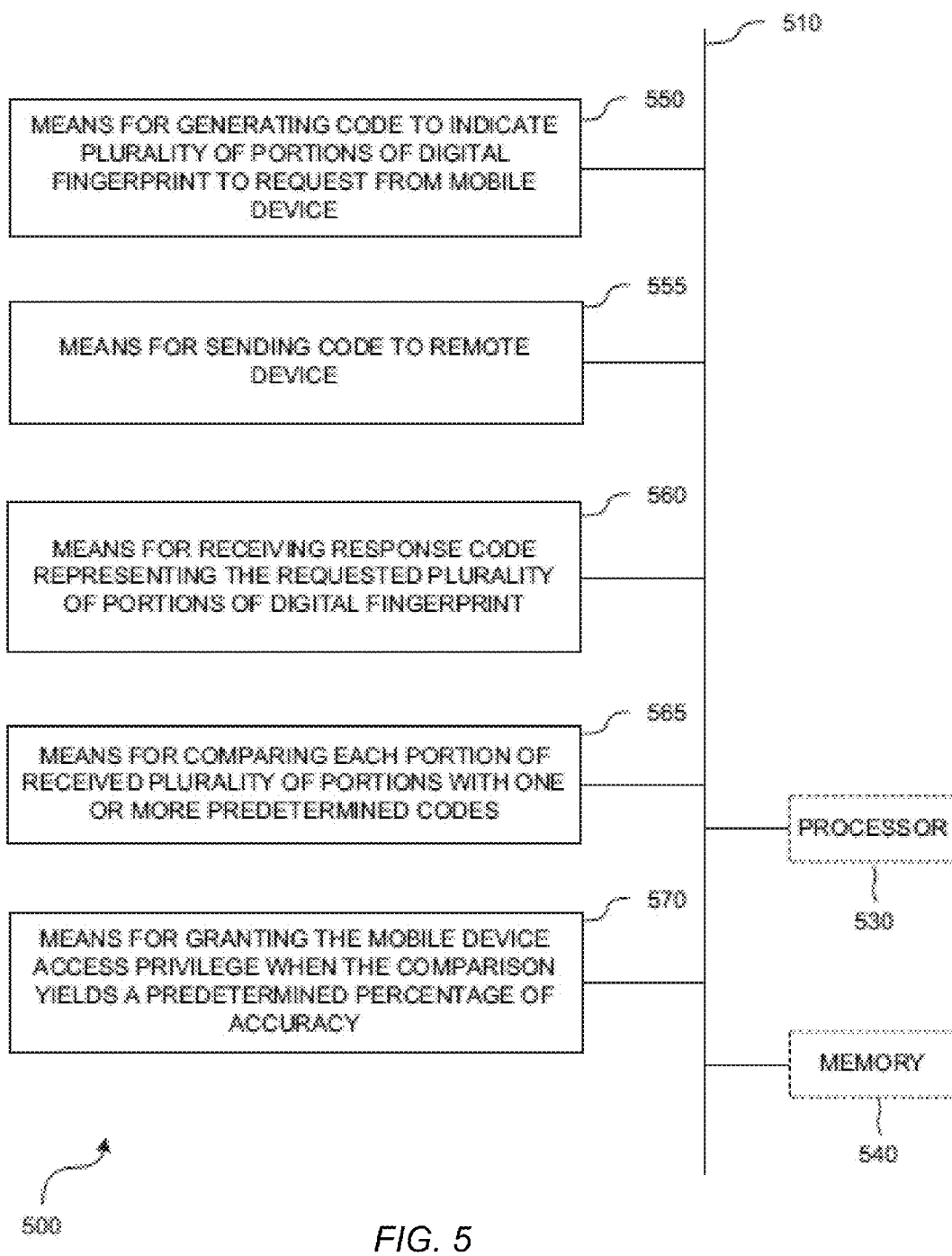
FIG. 5 is a block diagram illustrating one embodiment of a system according to the invention for authenticating a mobile device.

In accordance with one or more embodiments of the present invention, there are provided devices and apparatuses for authenticating a mobile device. With reference to FIG. 5, there is provided an exemplary apparatus 500 that may be configured as either a computing device, or as a processor or similar device for use within a computing device. As illustrated, apparatus 500 may include: a means 550 for generating a code to indicate a plurality of portions of a digital fingerprint to request from a mobile device; a means 555 for sending the code to the remote device; a means 560 for receiving the response code representing the requested plurality of portions of digital fingerprint; a means 565 for comparing each portion of the received plurality of portions with one or more predetermined codes; and a means 570 for granting the mobile device access to the secured network based on the comparison. Alternatively, the mobile device may only be granted access to the secured network if a result of the comparison satisfies a predetermined minimum accuracy.

It is noted that apparatus 500 may optionally include a processor module 530 having at least one processor, in the case of apparatus 500 configured as computing device, rather than as a processor. Processor 530, in such case, may be in operative communication with means 550-570, and components thereof, via a bus 410 or similar communication coupling. Processor 530 may effect initiation and scheduling of the processes or functions performed by means 550-570, and components thereof.

In further related aspects, apparatus 500 may optionally include a means for storing information, such as, for example, a memory device/module 540. Computer readable medium or memory device/module 540 may be operatively coupled to the other components of apparatus 500 via bus 510 or the like. The computer readable medium or memory device 540 may be adapted to store computer readable instructions and data for effecting the processes and behavior of means 550-580, and components thereof, or processor 540 (in the case of apparatus 500 configured as a computing device) or the methods disclosed herein.

In yet further related aspects, the memory module 540 may optionally include executable code for the processor module 530 to: (a) generate a code to indicate one or more portions of digital fingerprint to request from a mobile device; (b) send the request code to a remote device; (c) receive a response code; (d) compare the response code or a deciphered version of the response code to predetermined codes or stored portions of digital fingerprints of a known and authorized mobile device; and (e) grant the mobile device access privilege based on the comparison. One or more of steps (a)-(e) may be performed by processor module 430 in lieu of or in conjunction with the means 550-570 described above.

Figure 6:
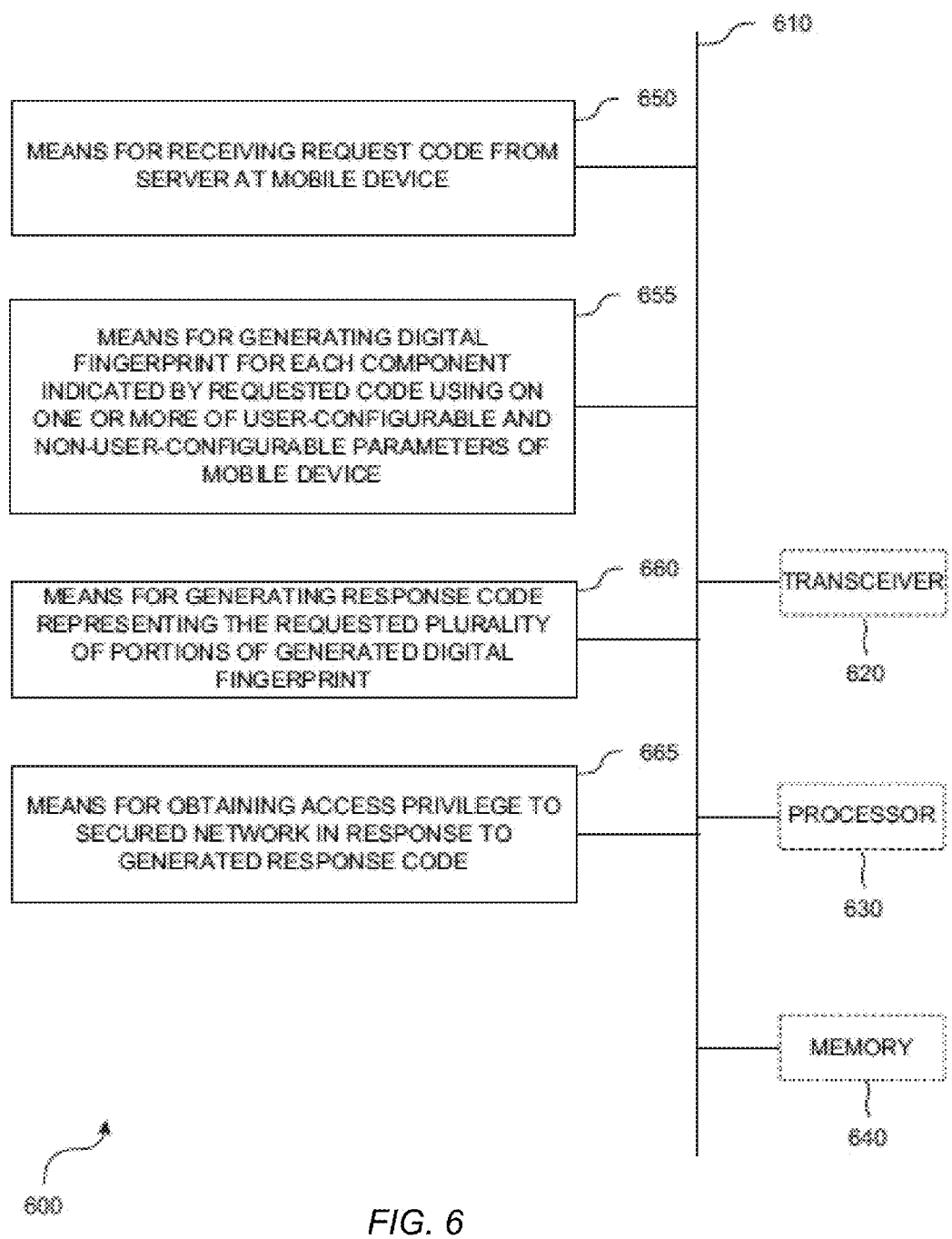
FIG. 6 is a block diagram illustrating another embodiment of a system according to the invention for authenticating a mobile device.

In accordance with one or more embodiments of the present invention, there are provided devices and apparatuses for authenticating a mobile device. With reference to FIG. 6, there is provided an exemplary apparatus 600 that may be configured as either a computing device, or as a processor or similar device for use within a computing device. As illustrated, apparatus 600 may include: a means 650 for receiving a request code; a means 655 for generating a digital fingerprint for each component indicated by the request code; a means 660 for generating a response code based on the generated digital fingerprint, which was generated based on the request code; and a means 665 for obtaining access privilege to a secured network in response to the generated response code.

It is noted that apparatus 600 may optionally include a processor module 630 having at least one processor, in the case of apparatus 600 configured as computing device, rather than as a processor. Processor 630, in such case, may be in operative communication with means 650-680, and components thereof, via a bus 610 or similar communication coupling. Processor 630 may effect initiation and scheduling of the processes or functions performed by means 650-665, and components thereof.

In related aspects, apparatus 600 may include a transceiver module 620 for communicating with means 650-665. A stand-alone receiver and/or stand-alone transmitter may be used in lieu of or in conjunction with the transceiver 620.

In further related aspects, apparatus 600 may optionally include a means for storing information, such as, for example, a memory device/module 640. Computer readable medium or memory device/module 640 may be operatively coupled to the other components of apparatus 600 via bus 610 or the like. The computer readable medium or memory device 640 may be adapted to store computer readable instructions and data for effecting the processes and behavior of means 650-665, and components thereof, or processor 640 (in the case of apparatus 600 configured as a computing device) or the methods disclosed herein.

In yet further related aspects, the memory module 640 may optionally include executable code for the processor module 630 to: (a) receive a request code; (b) generate a digital fingerprint based on information contained in the request code; (c) generate a response code based on the generated digital fingerprint; and (d) obtain access to the secured network in response to the response code. Steps (a)-(d) may be performed by processor module 630 in lieu of or in conjunction with the means 650-665 described above.

It is noted that one or more of the techniques and methodologies described herein may be performed by embedded applications, platforms, or systems. The methods described herein may be performed by a general-purpose computer system and/or an embedded application or component of a special-purpose apparatus (e.g., traffic controller, traffic signal, surveillance cameras, sensors, detectors, vehicles, vehicle navigation systems, mobile phones, PDAs, etc.).

In one embodiment, the special-purpose device comprises an embedded platform running an embedded Linux operating system (OS) or the like. For example, the unique device identifier or fingerprint for the special-purpose device may be created by collecting and using one or more of the following information: machine model; processor model; processor details; processor speed; memory model; memory total; network model of each Ethernet interface; network MAC address of each Ethernet interface; BlackBox model (e.g., any Flash device); BlackBox serial (e.g., using Dallas Silicone Serial DS-2401 chipset or the like); OS install date; nonce value; nonce time of day; any other predefined hardware information stored (optionally encrypted) in EEPROM; and any variations/combinations thereof.

While the present invention has been illustrated and described with particularity in terms of preferred embodiments, it should be understood that no limitation of the scope of the invention is intended thereby. Features of any of the foregoing methods and devices may be substituted or added into the others, as will be apparent to those of skill in the art. It should also be understood that variations of the particular embodiments described herein incorporating the principles of the present invention will occur to those of ordinary skill in the art and yet be within the scope of the invention.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

It is understood that the specific order or hierarchy of steps in the processes disclosed herein in an example of exemplary approaches. Based upon design preferences, it is understood that the specific order or hierarchy of steps in the processes may be rearranged while remaining within the scope of the present disclosure. The accompanying method claims present elements of the various steps in sample order, and are not meant to be limited to the specific order or hierarchy presented.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical discs (e.g., compact disc (CD), digital versatile disc (DVD), etc.), smart cards, and flash memory devices (e.g., Erasable Programmable Read Only Memory (EPROM), card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

What is claimed is:

1. A method for authenticating a mobile device, the method comprising:
generating a code to indicate a plurality of portions of a digital fingerprint to request from the mobile device, wherein each portion represents a parameter of a different component of the mobile device;
sending the code to a remote location; receiving from the remote location a response code representing the requested plurality of portions of the digital fingerprint; comparing each portion of the received plurality of portions with one or more predetermined codes; and
granting the mobile device an access privilege when a result of the comparison satisfies a predetermined minimum accuracy.

2. The method of claim 1, wherein each portion of the digital fingerprint is based on one of a user-configurable parameter and a non-user-configurable parameter of the mobile device.

3. The method of claim 1, wherein the plurality of portions represent at least one user-configurable parameter and at least one non-user-configurable parameter of the mobile device.

4. The method of claim 1, wherein sending the code to the remote location comprises sending the code to the mobile device using a short messaging system (SMS).

5. The method of claim 1, wherein sending the code to the remote location comprises sending the code to an email address.

6. The method of claim 1, wherein the response code is received via an SMS message from the mobile device.

7. A non-transitory computer readable medium having stored thereon computer executable instructions that, when executed by a computing device, cause the computing device to perform a method comprising steps for:
generating a code to indicate a plurality of portions of a digital fingerprint to request from a mobile device, wherein each portion represents a parameter of a different component of the mobile device;
sending the code to a remote location; receiving a response code representing the requested the plurality of portions of the digital fingerprint; comparing each portion of the received plurality of portions with one or more predetermined codes; and
granting the mobile device access privilege when a result of the comparison satisfies a predetermined minimum accuracy.

8. The computer readable medium of claim 7, wherein each parameter is based on one of a user-configurable parameter and a non-user-configurable parameter of the mobile device.

9. The computer readable medium of claim 7, wherein the plurality of portions represent at least one user-configurable parameter and at least one non-user-configurable parameter of the mobile device.

10. The computer readable medium of claim 7, wherein sending the code to the remote location comprises sending the code to the mobile device using a short messaging system (SMS).

11. The computer readable medium of claim 7, wherein sending the code to the remote location comprises sending the code to an email address.

12. The computer readable medium of claim 7 wherein the receiving step further comprises receiving the response code via an SMS message from the mobile device.

13. A method for authenticating a mobile device, the method comprising:
receiving a request code from a server in communication with the mobile device, the request code indicating a plurality of portions of a digital fingerprint of the mobile device, wherein each portion represents a parameter of a different component of the mobile device;
deriving the digital fingerprint from the request code; generating a response code that includes the derived digital fingerprint; and
transmitting the response code to a secure network to obtain an access privilege thereto for direct communication from the mobile device.

14. The method of claim 13 wherein each of the different parameters is one of a user-configurable parameter and a non-user-configurable parameter of the mobile device.

15. The method of claim 13 wherein the plurality of portions represent at least one user-configurable parameter and at least one non-user-configurable parameter of the mobile device.

16. The method of claim 13, further comprising sending the response code to the server via short messaging system (SMS).

17. The method of claim 13, further comprising sending the response code to the server via email.

* * * * *